Dec. 16, 1969   J. B. VRABLE   3,484,349
METHOD OF PROTECTING BURIED STEEL BODIES AGAINST CORROSION
Filed Feb. 9, 1967
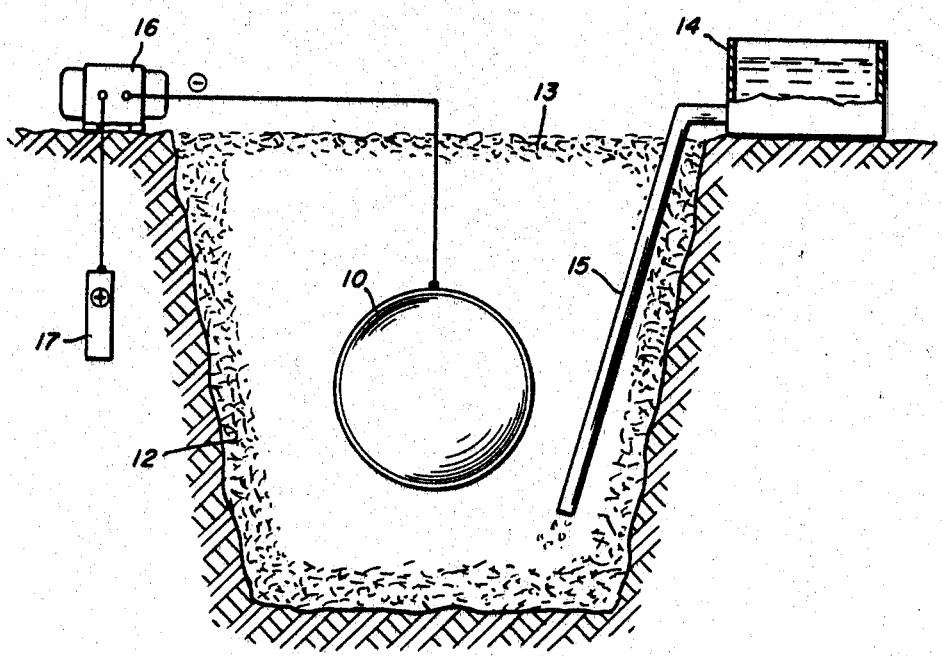
INVENTOR
JOHN B. VRABLE
By Donald G. Dalton
Attorney

United States Patent Office 3,484,349
Patented Dec. 16, 1969

3,484,349
METHOD OF PROTECTING BURIED STEEL BODIES AGAINST CORROSION
John B. Vrable, Salem Township, Westmoreland County, Pa., assignor to United States Steel Corporation, a corporation of Delaware
Filed Feb. 9, 1967, Ser. No. 614,859
Int. Cl. C23f 13/00
U.S. Cl. 204—147                     4 Claims

ABSTRACT OF THE DISCLOSURE

A method of protecting a buried steel body against corrosion in which a coating of $CaCO_3$ is precipitated on the surface.

---

This invention relates to an improved method of protecting a buried steel body against corrosion.

It is known that a buried steel body can be protected against corrosion by "cathodic control"; that is, the walls of the body are connected in a D-C electric circuit in which their outer surfaces become a cathode. Damp earth surrounding the body acts as a catholyte. A chemical change accompanies passage of electric current from the catholyte to the body. Both hydrogen evolution and oxygen reduction reactions occur to produce hydroxyl ions. The reactions are as follows:

$$2H_2O + 2e^- \rightarrow H_2 + 2OH^-$$

and $$\tfrac{1}{2}O_2 + H_2O + 2e^- \rightarrow 2OH^-$$

It is conventional also to protect a buried steel body against corrosion by coupling it to an expendable anode of a more anodic metal, such as magnesium. The damp earth acts as an electrolyte to produce a direct current between anode and cathode without need for any other current source. The greater the exposed area of the body, the larger the current required to protect it or the more rapidly the expendable anode is consumed.

An object of the present invention is to provide an improved cathodic control method which effectively protects a steel body against corrosion and is more economical than previous methods.

A more specific object is to provide an improved method of protecting a steel body cathodically in which I precipitate a calcium carbonate coating on the exposed surface of the body, thereby diminishing the exposed area and affording greater protection.

In the drawing:

The single figure is a diagrammatic vertical sectional view of a buried steel body illustrating my method of protecting it.

The figure shows a steel body 10, for example a gasoline storage tank, previously buried beneath the ground line. The body lies within a pit 12 which contains backfill 13, usually sand. In accordance with my invention, I place a tank 14 on the ground above the pit, and extend a pipe 15 from the tank into the backfill 13 surrounding the body 10. Tank 14 contains a mixture of calcium carbonate, carbon dioxide and water, which react to form calcium bicarbonate according to the reaction:

$$CACO_3 + CO_2 + H_2O \rightarrow Ca(HCO_3)_2$$

The calcium bicarbonate thus formed is soluble. The mixture flows through pipe 15 and permeates the backfill. In a new installation I prefer to use calcium carbonate as backfill, in which event contact with ground water and carbon dioxide forms calcium bicarbonate through natural processes. In either instance the body is surrounded by a mixture of calcium carbonate and water in which the calcium carbonate dissolves as the bicarbonate. The quantity of calcium carbonate should be in the range of about 0.3 to 15 pounds per square foot of exposed body surface.

I connect the negative terminal of a D-C source 16 to the steel body 10, and I connect the positive terminal thereof to an inert anode 17 buried in the ground near the body. Conveniently the source can be a small welding generator. The current density is in the range of about 50 to 500 milliamperes per square foot. Flow of current from the anode 17 through the ground and solution to the body 10 forms hydroxyl ions according to the two reactions hereinbefore stated. These ions react with the calcium bicarbonate and precipitate calcium carbonate according to the reaction:

$$Ca^{++} + HCO_3^- + OH^- \rightarrow CaCO_3 + H_2O$$

The calcium carbonate precipitates on the surface of the steel body as a tightly adhering high-resistance coating. The total ampere-hours required to form a suitable coating are about 10 to 20.

After the coating forms, a much smaller current protects the body against corrosion. The only parts of the body which require cathodic protection are remote areas which are not fully coated. Once the body is coated, the current source can be removed, and the body protected by coupling it with an expendable anode in the conventional manner. The life of the anode is appreciably extended over an anode coupled with an uncoated body.

While I have shown and described only a single embodiment of my invention, it is apparent that modifications may arise. Therefore, I do not wish to be limited to the disclosure set forth but only by the scope of the appended claims.

I claim:

1. A method of protecting the exterior surface of a buried steel body against corrosion, said body lying within a pit which contains sand or calcium carbonate backfill and being surrounded by a mixture of calcium carbonate and water in which the carbonate dissolves as the bicarbonate, said method comprising applying direct current between a buried inert anode and said body to deposit a coating of calcium carbonate on the exposed exterior surface of said body, and thereafter continuing the application of direct current at a lower density to protect said body cathodically.

2. A method as defined in claim 1 in which the mixture of calcium carbonate and water is injected into the backfill.

3. A method as defined in claim 1 in which said mixture contains 0.3 to 15 pounds calcium carbonate per square foot of exposed surface of said body and the current first applied is of a density of 50 to 500 milliamperes per square foot of exposed surface.

4. A method as defined in claim 3 in which the current applied to said body after the coating is deposited thereon is obtained by coupling an expendable anode to the body.

References Cited

UNITED STATES PATENTS

| | | | |
|---|---|---|---|
| 2,571,062 | 10/1951 | Robinson et al. | 204—197 |
| 2,645,612 | 7/1953 | Taylor | 204—197 |
| 3,074,862 | 1/1963 | Sudrabin | 204—147 |
| 3,168,455 | 2/1965 | Shapiro et al. | 204—148 |
| 3,354,063 | 11/1967 | Shutt | 204—197 |

OTHER REFERENCES

"Underground Corrosion," NBS Circular 579, April 1957, p. 8.

JOHN H. MACK, Primary Examiner

T. TUNG, Assistant Examiner

U.S. Cl. X.R.

204—56, 148, 181, 196, 197